US005301971A

United States Patent [19]

Brereton et al.

[11] Patent Number: 5,301,971

[45] Date of Patent: Apr. 12, 1994

[54] RATCHETING WHEELCHAIR HUB

[76] Inventors: H. Arthur Brereton, 417 Crescent, NE., Grand Rapids, Mich. 49503; Charles C. Harrett, Jr., 933 Lakeside, Grand Rapids, Mich. 49506

[21] Appl. No.: 966,349

[22] Filed: Oct. 26, 1992

Related U.S. Application Data

[63] Continuation-in-part of Ser. No. 840,028, Feb. 24, 1992, abandoned.

[51] Int. Cl.[5] .................... B62M 1/14

[52] U.S. Cl. .................... 280/250.1; 280/249; 280/242.1

[58] Field of Search .................... 280/250.1, 249, 242.2, 280/304.1; 188/82.7, 2 F

[56] References Cited

U.S. PATENT DOCUMENTS

| | | | |
|---|---|---|---|
| 3,253,837 | 5/1966 | Johnson | 280/249 X |
| 4,840,076 | 6/1989 | Brubaker et al. | 74/143 |
| 5,007,655 | 4/1991 | Hanna | 280/250 |
| 5,020,818 | 6/1991 | Oxford | 280/250 |
| 5,037,120 | 8/1991 | Parisi | 280/250 |
| 5,137,295 | 8/1992 | Peek | 280/304.1 |
| 5,211,414 | 5/1993 | Galumbeck | 88/82.7 X |

*Primary Examiner*—Joseph D. Pape

*Attorney, Agent, or Firm*—Reising, Ethington, Barnard, Perry & Milton

[57] ABSTRACT

A wheelchair (10) for forwardly transporting a person in a sitting position includes a frame (12), a seat (14) and an axle (16). A pair of drive wheels (18) are rotatably supported on the axle (16) and rollably support the wheelchair (10) above a travel surface. A ratchet assembly (22) engages the drive wheels (18) directly with the axle (16) to permit free rotation of the drive wheels (18) forwardly but prevent rearward rotation thereof.

30 Claims, 4 Drawing Sheets

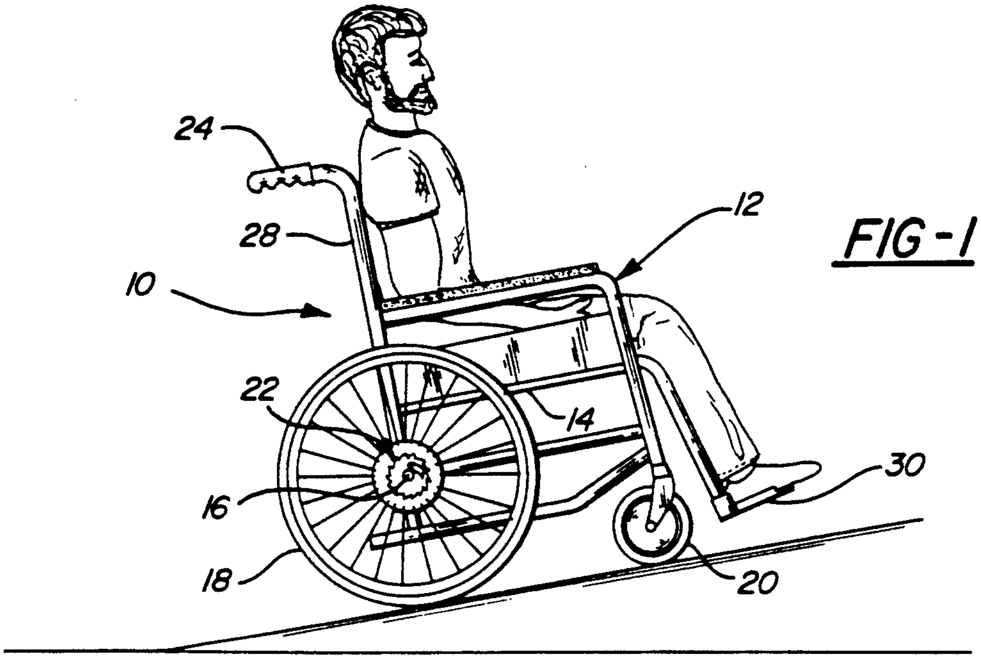
FIG-1
FIG-5
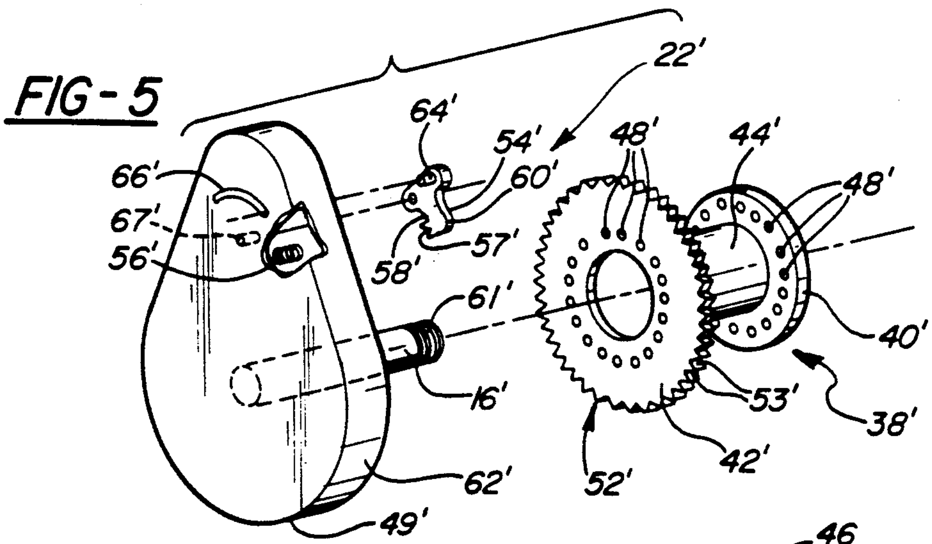
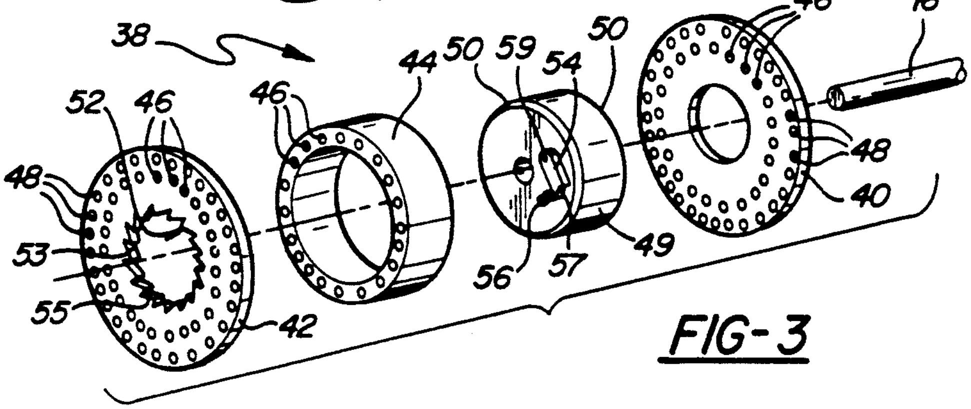
FIG-3

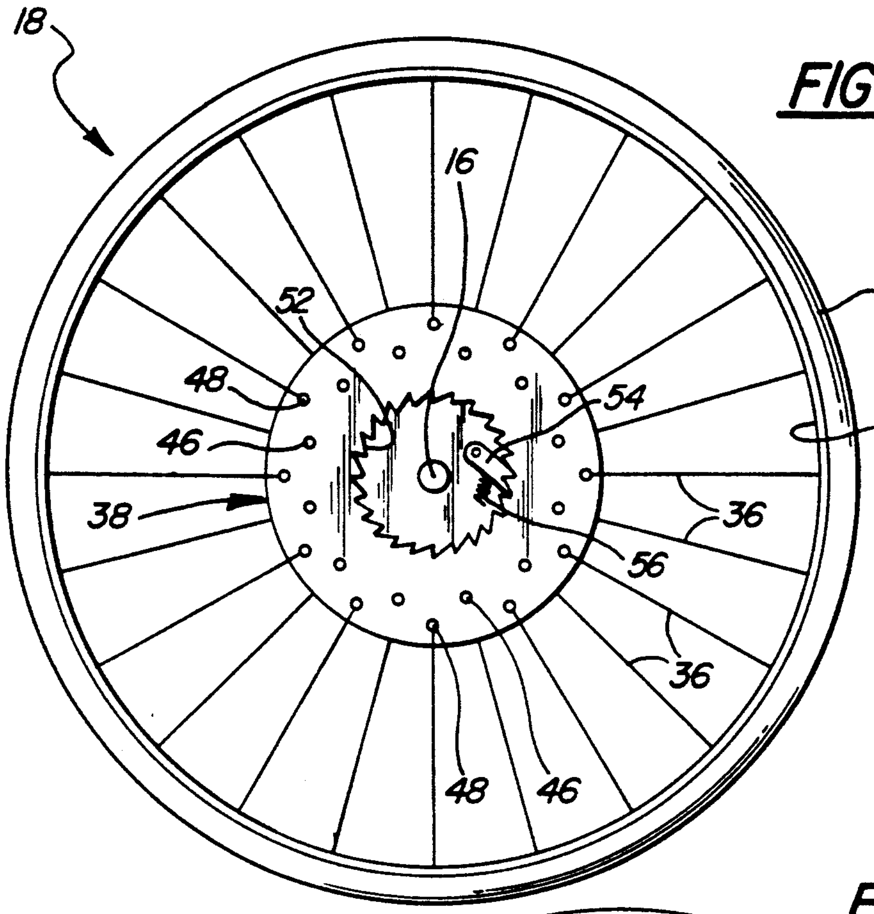
FIG-2
FIG-4
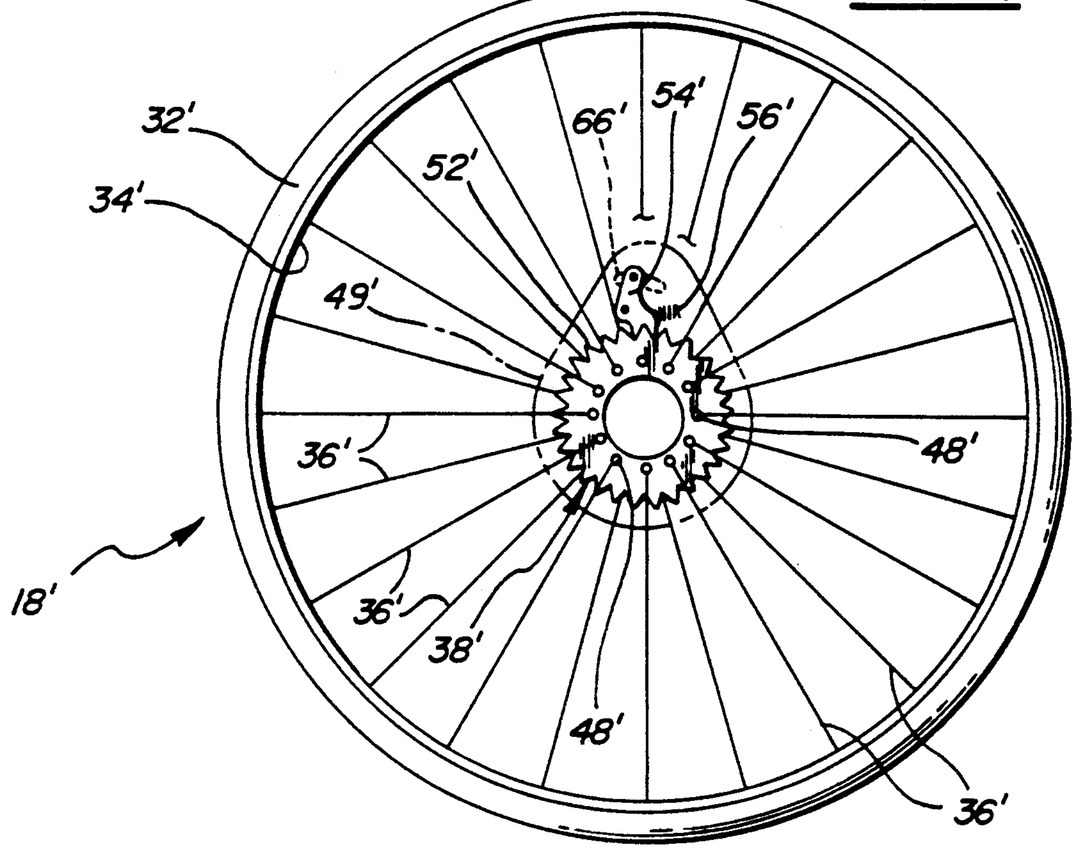

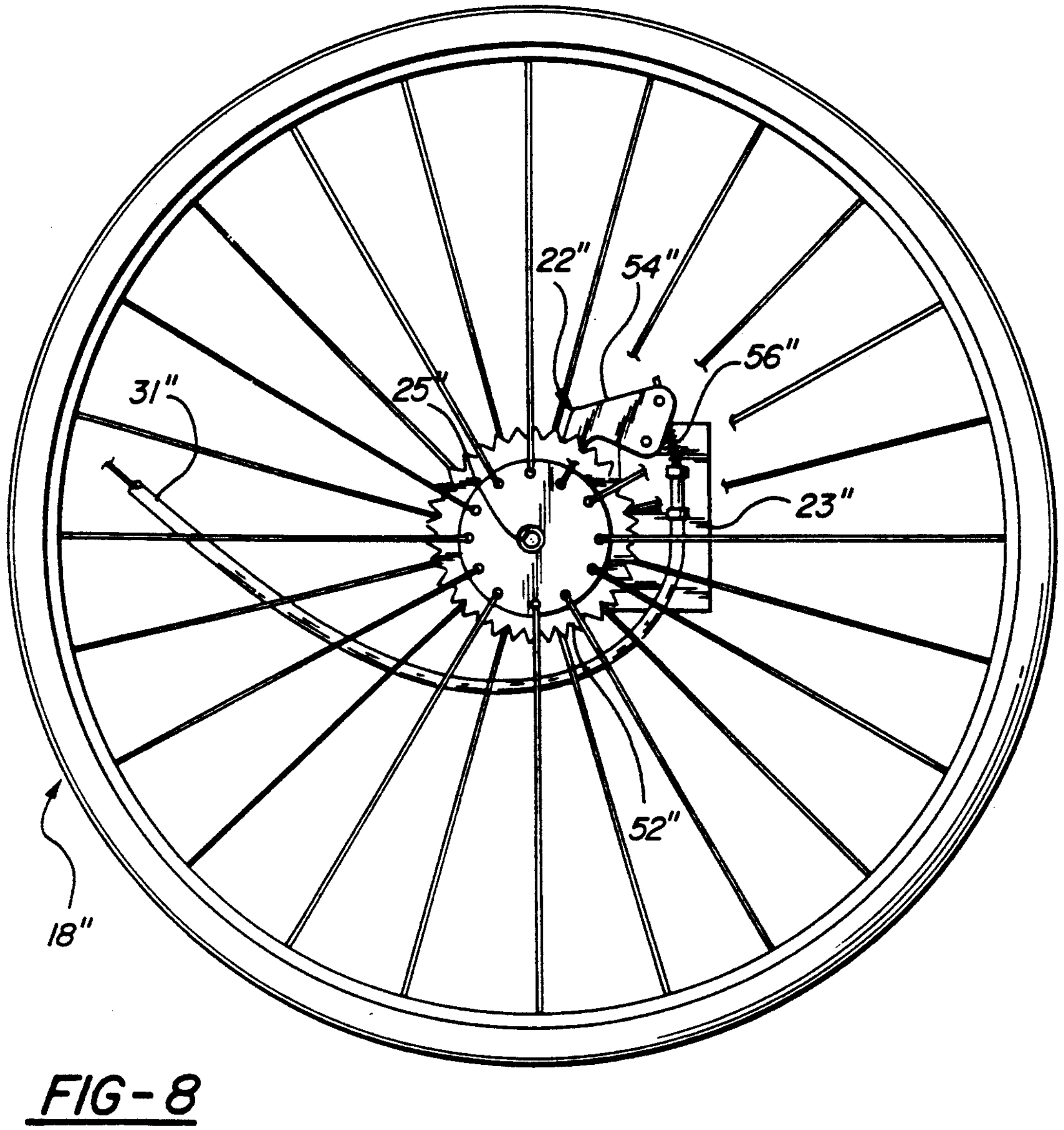
FIG-8
FIG-9
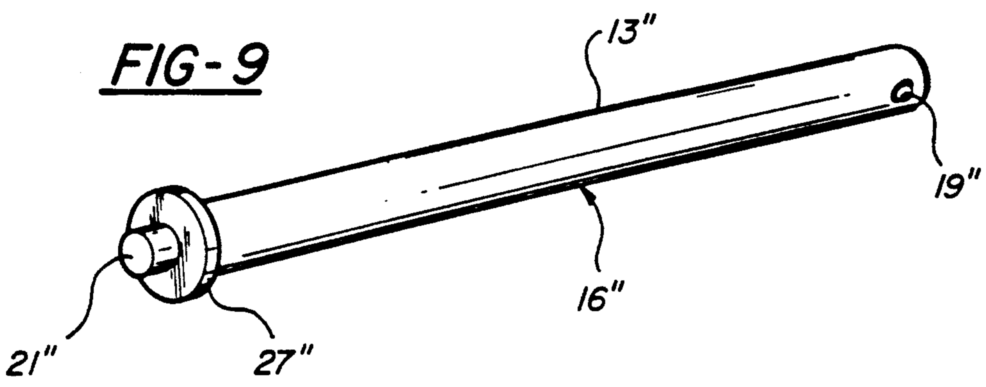

RATCHETING WHEELCHAIR HUB

This application is a continuation-in-part of U.S. Ser. No. 840,028, filed Feb. 24, 1992, now abandoned.

TECHNICAL FIELD

The subject invention generally relates to a wheelchair for transporting a person in a sitting position. More specifically, the invention relates to a ratcheting wheel hub assembly for a wheelchair to prevent rearward motion of the wheelchair.

BACKGROUND ART

Wheelchairs are convenient for elderly and disabled passengers to travel without the use of their legs. The standard wheelchairs generally include a seat, a frame, an axle, two drive wheels, and two castor wheels. A passenger propels the wheelchair by grabbing a ring on each drive wheel and rolling the wheelchair forward.

A common way to make businesses and homes more accessible to wheelchairs is to install ramps in areas where stairs are present. A problem arises, however, when the wheelchair is disposed on an incline. Due to gravity and the rolling action of the wheelchair, there is a tendency for the wheelchair to roll backwards down the incline. Accordingly, brakes are included on the drive wheels to prevent this motion. This does not, however, aid the passenger attempting to climb an incline as the brakes must be released to allow forward progress of the wheelchair.

Many wheelchair users lack the strength to climb even a moderate incline in one uninterrupted exertion. However, the user cannot rest or the wheelchair will roll rearwardly down the incline. Furthermore, the brakes are almost impossible to use during a climb because if the wheels are released to apply the brakes, the wheelchair will begin rolling rearwardly before the brakes can be actuated. Thus, the wheelchair user would still be dependent on the assistance of others in climbing the incline.

Ratcheting wheelchair wheel assemblies have been created to solve this problem. These assemblies permit rotation of the drive wheels in only one direction. Thus, forward motion of the wheelchair is permitted for a passenger attempting to climb an incline. However, the passenger can rest without fear of losing forward progress because the ratchet assembly will prevent rearward motion of the wheelchair. The passenger may then continue forward progress after resting, and complete climbing the incline.

The current one way wheel assemblies, while effective, are undesirable for many reasons. Primarily, the ratcheting mechanisms are often highly complex and require a separate connection apparatus to interact with the drive wheels. The complexity of the mechanism leads to difficult and labor intensive assembly. Furthermore, these complex systems are costly due to the large number of parts required for construction.

For example, U.S. Pat. No. 4,865,344 to Romero, Sr. et al, issued Sep. 12, 1989, discloses a wheelchair including a ratcheting wheel assembly of this type. The wheelchair includes a drive wheel rotatably disposed on a primary axle. A separate secondary wheel is rotatably disposed on a secondary axle and is connected to the primary wheel via a chain. The movement of the secondary wheel is controlled by the ratcheting assembly, and a control assembly moves the ratcheting assembly into and out of engagement. The ratchet assembly thus directly controls the rotating motion of the secondary wheel, and indirectly controls the motion of the drive wheel.

SUMMARY OF THE INVENTION AND ADVANTAGES

The present invention involves a wheelchair assembly for forwardly transporting a passenger in a sitting position while preventing rearward movement when disposed on an incline. The wheelchair assembly comprises seat means for supporting a passenger in a forwardly facing sitting position and an axle means for extending outwardly from the seat means. A pair of drive wheels are rotatably supported on the axle means for rollably supporting the seat means above a travel surface. The invention is characterized by ratchet means ratchetingly interconnecting the axle means with at least one of the drive wheels for permitting rotation of the wheel in one direction while preventing rotation in the opposite direction. In this manner the wheelchair assembly is freely moveable forwardly but is prevented from rearward movement.

The present invention improves upon the prior art by providing a direct ratcheting connection between the drive wheels and the axle. In this manner, a secondary axle and ratcheting system is not needed and the number of components required for manufacture and assembly is reduced.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of the wheelchair of the present invention disposed on an incline and transporting a passenger;

FIG. 2 is a side view of a drive wheel of the preferred embodiment;

FIG. 3 is an exploded perspective view of the wheel hub, axle hub and ratchet assemblies of FIG. 2;

FIG. 4 is a side view of a drive wheel of an alternative embodiment;

FIG. 5 is an exploded view of the wheel hub, axle hub and ratchet assemblies of FIG. 4;

FIG. 8 is a side view of the drive wheel of the second alternative embodiment; and FIG. 9 is a perspective view of the pintle of the second alternative embodiment.

DETAILED DESCRIPTION OF THE INVENTION

Figure 6:
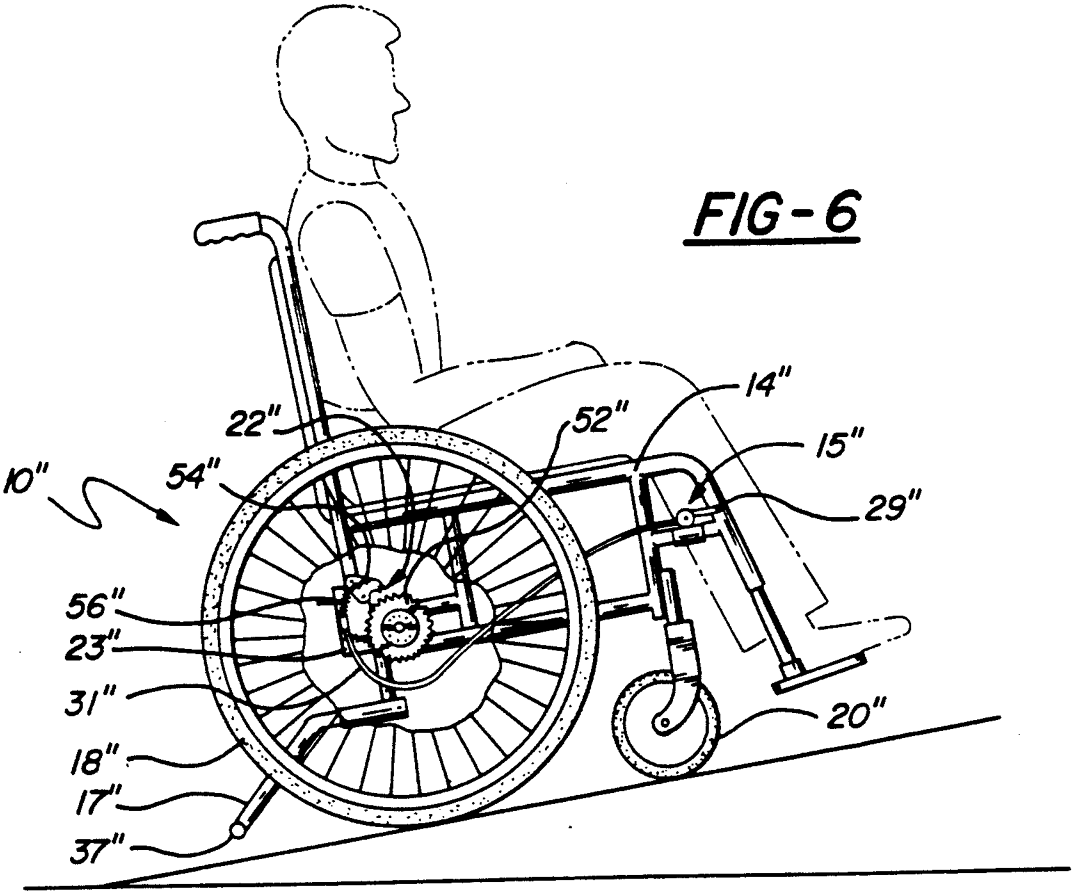
FIG. 6 is a side view of the wheelchair of the second alternative embodiment.

A wheelchair assembly for forwardly transporting a passenger in a sitting position and for preventing rearward motion when disposed on an incline is generally shown at 10 in FIG. 1. The wheelchair assembly 10 includes a frame 12 upon which seat means 14 is mounted. The seat means 14 supports a passenger in a sitting position as shown in FIG. 1. An axle means 16 is further included for extending outwardly from the seat means 14. A pair of drive wheels 18 is rotatably supported on the axle means 16 for rollably supporting the wheelchair assembly 10 above a travel surface. Two castor wheels 20 are mounted on the frame 12 to provide added support for the wheelchair assembly 10. A ratchet means 22 ratchetingly interconnects the axle means 16 with the drive wheels 18 in ratcheting engagement to permit rotation of the drive wheels 18 in only one direction.

The frame 12 is generally a tubular steel, composite or aluminum structure. The frame 12 provides support for the seat means 14 and the axle means 16. The seat means 14 supports a passenger in a sitting position. The frame 12 includes a pair of spaced handles 24 protruding rearwardly from the wheelchair 10 to provide a convenient holding location for a person pushing the wheelchair 10. A backrest portion 28 is perpendicular to the seat means 14 and supports the back of a passenger in an upright position. A leg support 30 is attached to the frame 12 in front of and below the seat means 14. The leg support 30 supports the legs of the passenger in an elevated position above the travel surface.

The axle means 16 comprises right and left pintles extending from the frame of the wheelchair on the right and left sides, respectively. The pintles are fixedly mounted on the frame 12 of the wheelchair assembly 10. The pintles are cylindrical projections defining a horizontal axis of rotation for each of the drive wheels 18.

The drive wheel 18 of the preferred embodiment is best shown in FIG. 2. The drive wheel 18 comprises a tire 32 disposed on a wheel rim 34. The wheel rim 34 includes spokes 36 which connect the wheel rim 34 to a wheel hub 38. The spokes radiate outwardly from the wheel hub 38 to provide support and stability for the wheel rim 34.

The wheel hub 38 is best shown in FIG. 3 and includes an inner end plate 40, an outer end plate 42 and a spacer member 44. The inner and outer end plates 40,42 are flat, annular members and each include interior and exterior circular edge surfaces. The end plates 40,42 are of substantially equal outer diameters. The spacer member 44 is a hollow, cylindrical member disposed concentrically between the inner and outer end plates 40,42 and having an outer diameter smaller than the outer diameters of the end plates 40,42. A plurality of axially aligned bolt holes 46 are included on the spacer member 44 and end plates 40,42 to facilitate the fastening together of the end plates 40,42 and the spacer member 44. Spoke holes 48 are disposed in the inner and outer end plates 40,42. In this manner the spokes 36 can be fixedly attached to the wheel hub 38.

Axle hubs 49 as shown in FIG. 3 are included in the preferred embodiment and are fixedly mounted on the right and left pintles of the axle means 16. The axle hubs 49 are drum shaped and are rotatably disposed within a chamber formed inside the spacer member 44 and bounded on each end by the end plates 40,42. Each axle hub 49 further includes two bearing grooves 50 into which bearings (not shown) are disposed. The free movement of the bearings in the bearing grooves 50 facilitate the rotating motion of the axle hub 49 within the chamber 49.

The ratchet means 22 includes a set of ratchet gear teeth 52 circumferentially disposed along the entirety of the interior edge surface of the outer end plate 42 and evenly spaced thereabout. Each of the gear teeth 52 is an acute wedge member that includes a ramping surface 53 and an engaging surface 55. A pawl 54 is pivotally disposed on the axle hub 49 in ratcheting engagement with the gear teeth 52. The pawl 54 includes a jaw 57 which is of substantially the same size as each of the individual gear teeth 52. The pawl pivots about a pivot pin 59 that has an axis of rotation distinct from the axis of rotation of the wheel hub 38. A spring 56 is fixedly mounted on the axle hub 49 and is biased against the pawl 54 to provide a constant engaging force between the pawl 54 and the gear teeth 52.

In operation, as the wheelchair assembly 10 is propelled forwardly the drive wheels 18 move a corresponding distance across the travel surface. The ratchet means 22 permits such forward motion but will automatically prevent rearward motion of the wheelchair assembly 10. Specifically, as the drive wheel 18 rotates forwardly about the axle means 16 the ratchet gears 52 on the drive wheel hub 38 rotate with respect to the axle hub 49. The ramping surfaces 53 on the gear teeth 52 slidingly ratchet past the jaw 57 on the pawl 54. As the ramping surfaces 53 engage the pawl 54, the pivotal action of the pawl 54 allows the gear teeth 52 to slide therepast. The constant biasing force provided by the spring 56 then forces the pawl into engagement with a subsequent gear tooth 52 after the previous tooth 52 has pivotally moved the pawl 54 out of its travel path. When rearward motion of the drive wheels 18 is attempted, however, the ratchet means 22 prevents this motion. The engaging surface 55 on one of the ratchet gear teeth 52 moves into secure engagement with the jaw 57 on the pawl 54. The gear teeth 52 impose a force on the pawl 54 directly in line with the pivot point 59 thereby preventing the pawl 54 from pivoting out of the travel path of the gear teeth 52. Accordingly, rearward motion is prevented and a passenger can freely travel up an incline at any desired distance increment without the threat of rearward motion.

A drive wheel 18' of the alternative embodiment is shown in FIG. 4. The drive wheel 18' also includes a tire 32', a wheel rim 34', spokes 36' and a wheel hub 38' arranged in a similar manner to those components in the drive wheel 18 described and illustrated in connection with the preferred embodiment.

The wheel hub 38' is best illustrated in FIG. 5 and comprises a hollow cylindrical center portion 44' fixedly attached to an outer flange 42' and an inner flange 40'. The outer flange 42' is circular and generally of a larger diameter than the circular inner flange 40'. Spoke holes 48' are included on the outer flange 42' and inner flange 40' to permit mounting of the spokes 36' on the wheel hub 38'. The wheel hub 38' is rotatably mounted on the axle means 16' by positioning the axle means 16' within the hollow cylindrical center portion of the wheel hub 38'.

An axle hub 49' of the alternative embodiment is fixedly attached to axle means 16'. The axle means 16' includes a threaded end portion 61' to facilitate attachment by nut means (not shown) to the frame 12 of the wheelchair 10. The axle hub 49' has a generally circular lower periphery with a gradually decreasing width near the top. The axle hub 49' includes a perpendicular lip 62' which circumscribes the outer periphery of the axle hub 49'. The axle hub 49' further includes a hollow channel 66' which is radially equidistant from a pivot point 67'. Upon insertion of the axle means 16' within the wheel hub 44', the axle hub 49' surrounds the outer flange 42' of the wheel hub 44' and forms a cover plate thereover.

The ratchet means 22' of the alternative embodiment comprises a set of ratchet gear teeth 52' circumferentially disposed along the entirety of the outer periphery of the outer flange 42′ and evenly spaced thereabout. Each of the gear teeth 52′ is an acute, symmetrical wedge member that includes two ramping surfaces 53′. A pawl 54′ is pivotally mounted on the axle hub 49′ at the pivot point 67′. The pawl includes a jaw 57′ with a sliding surface 58′ and an engaging surface 60′ on opposing sides of the jaw 57′. The pawl 54′ further includes a guide stud 64′ which is securely disposed within the channel 66′ in the axle hub 49′. In this manner the range of free pivotal motion of the pawl 54′ is restricted to the extent that the guide stud 64′ can travel within the channel 66′. A spring 56′ is fixedly mounted on the axle hub 49′ and is biased against the pawl 54′ to provide a constant engaging force between the pawl 54′ and the gear teeth 52′.

In operation, the alternative embodiment performs in a similar manner to the preferred embodiment. Specifically, during forward motion of the drive wheel 18′ the ratchet gear teeth 52′ rotate with respect to the axle hub 49′. The ramping surfaces 53′ on the gear teeth 52′ move across the sliding surface 58′ on the pawl 54′ and past the jaw 57′. As the ramping surfaces 53′ engage the pawl 54′ in this manner, the pivotal action of the pawl 54′ allows the gear teeth 52′ to slide therepast. The constant biasing force provided by the spring 56′ then forces the pawl into engagement with a subsequent gear tooth 52′ after the previous tooth 52′ has pivotally moved the pawl 54′ out of its travel path. Rearward motion of the drive wheels 18 is not possible, however. As the gear teeth 52′ attempt to rotate rearwardly, the ramping surface 53′ strikes the engaging surface 60′ on the pawl 54′. This imposes a force on the pawl 54′ that is either directly in line with or below the pivot point 67′. In either case the pawl 54′ is maintained in engagement with the gear teeth 52′ and cannot rotate out of the travel path thereof. Accordingly, rearward motion is prevented in similar fashion to the preferred embodiment.

A wheelchair of the second alternative embodiment is generally shown at 10″ in FIG. 6. The wheelchair 10″ is substantially similar to the wheelchair 10 shown in FIG. 1. In other words, the wheelchair 10″ includes a seat means 14″, an axle means 16″, a pair of drive wheels 18″, and a ratchet means 22″. However, the axle means 16″ and ratchet means 22″ include unique features over the preferred or first alternative embodiments to be described subsequently. In addition, the wheelchair 10″ includes a ratchet release means 15″ and two rear support legs 17″ not included in the earlier embodiments.

The axle means 16″ is similar to the other embodiments, also including right and left pintles 13″ extending outwardly from each of the right and left sides of the seat means 14″, respectively. As shown in FIG. 9, the pintles 13″ each comprise a long, cylindrical shaft for permitting the drive wheels 18″ to rotate thereabout. However, unlike the prior embodiments the pintles 13″ are removably attached to the seat means 14″.

The pintles 13″ each include retractable projections 19″ disposed on the distal end thereof and extending outwardly therefrom. Upon depressing a release button 21″, an internal mechanism (not shown) inside the pintle 13″ shifts and allows the projections 19″ to be drawn within the pintle 13″. A spring (not shown) is disposed within the pintle 13″ and returns the release button 21″ to its original position after actuation, thereby preventing errant actuation thereof. The axle means 16″ further includes an axle bracket 23″ fixedly attached to the seat means 14″. The axle bracket 23″ includes a mounting hole (not shown) into which the pintle 13″ may be inserted.

To mount a drive wheel 18″ on the seat means 14″, first the wheel 18″ is positioned adjacent the axle bracket 23″ such that the center of the drive wheel hub 38″ is aligned with the mounting hole. Next, the pintle 13″ is inserted through an opening 25″ in the center of the drive wheel 18″ and through the mounting hole. The diameter of the pintle 13″ is only slightly smaller than the diameter of the mounting hole or of the opening 25″ in the drive wheel 18″. Thus, the release button 21″ must be depressed while the pintle 13″ is inserted to retract the projections 19″ and enable the pintle 13″ to be inserted therein. In other words, the projections 19″ extend radially outwardly from the pintle 13″ to a sufficient degree to prevent the pintle 13″ from being inserted without retracting the projections 19″.

A flange 27″ is circumferentially disposed about the pintle 13″ adjacent the release button 21″. The flange 27″ abuts against the drive wheel 18″ when the pintle 13″ is fully inserted and prevents over insertion or dislodgement of the pintle 13″ from the drive wheel 18″. Once the pintle 13″ is fully inserted, the distal end thereof extends outwardly from the mounting hole, permitting the projections 19″ as well to be free of the mounting hole. As the projections 19″ clear the mounting hole, the spring mechanism reextends the projections 19″ outwardly from the pintle 13″ beyond the diameter of the mounting hole. Thus, the pintle 13″ cannot be withdrawn from the mounting hole without pressing the release button 21″ and withdrawing the projections 19″.

Figure 7:
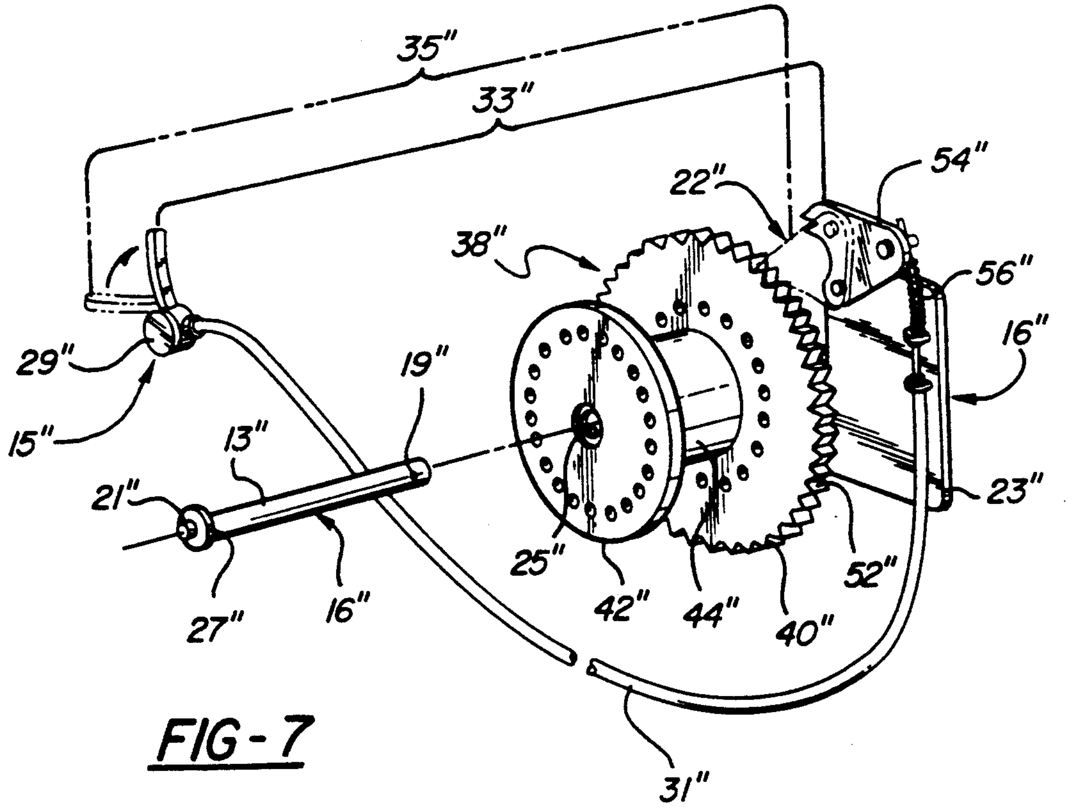
FIG. 7 is a perspective view of the wheel hub, ratchet means, and ratchet release means of the second alternative embodiment.

As shown in FIGS. 7 and 8, the ratchet means 22″ is also similar to the prior embodiments in that it includes a pawl 54″ and a set of ratchet gears 52″ for each drive wheel 18″ that directly connect the axle means 16″ and a corresponding drive wheel 18″ in ratcheting interconnection. Further, the drive wheels 18″ each include a fixedly connected drive wheel hub 38″ attached thereto including a hollow cylindrical center portion 44″. The hollow cylindrical center portion 44″ also includes inner and outer flanges 40″,42″ each having inner and outer peripheries.

However, the ratchet gears 52″ are disposed on the outer peripheries of the inner flanges 40″ of the cylindrical center portion 44″. In addition, the pawl 54″ is pivotally connected to the axle bracket 23″ adjacent to, and in ratcheting engagement with, the ratchet gears 52″. A spring 56″ biases the pawl 54″ against the ratchet gears 52″ and maintains the ratcheting engagement therebetween.

The ratchet release means 15″ shown in FIGS. 6 and 7 is included for releasing the ratchet means 22″ from the ratcheting interconnection between the axle means 16″ and the drive wheels 18″. Free rotation of the drive wheels 18″ in any direction is thereby permitted and the wheelchair assembly 10″ can be moved rearwardly when desired. The ratchet release means 15″ includes a control handle assembly 29″ disposed on the seat means 14″. The control handle assembly 29″ includes at least one control handle but could also include two handles, one for each drive wheel 18″. A remote control, push-pull cable 31″ connects the control handle assembly 29″ to the pawls 54″ of the ratchet means 22″ and joins the control handle assembly 29″ in remote control engagement therewith. The cable 31″ is of a type commonly known in the art and includes a flexible conduit and a flexible core element for transmitting forces along a curved path.

In operation, as the control handle assembly 29″ is actuated, the push-pull cable 31″ produces a corresponding movement in the pawls 54″ of the ratchet means 22″. In this manner, the pawl 54″ can be retracted away from the ratchet gears 52″ and thereby released from ratcheting interconnection therewith. The control handles of the control handle assembly 29″ have a limited range of motion, from an initial position 35″ (pawls engaged) to a final position 33″ (pawls disengaged). The push-pull cable 31″ is of a sufficient length such that when the handle is in the initial position 35″, there is no slack in the cable 31″ and a small amount of tension exists therein. Thus, when the handle is moved to the final position the cable 33″ responds immediately to pivot the pawl 54″ out of engagement with the ratchet gears 52″. Because the spring 56″ biases the pawl 54″ into engagement, it also maintains tension in the attached cable 31″ through the complete range of motion thereof.

It is important to note that the push-pull cable 31″, pawl 54″, and ratchet gears 52″ are all disposed adjacent or on the inner flange 40″ of the wheel hub 38″, as opposed to the outer flange 42″. This arrangement enables the drive wheel 18″ to be easily removed and replaced without encountering interference from the push-pull cable 31″ and ratchet means 22″. In other words, to place the ratchet means 22″ on the outer flange 42″ of the drive wheel 18″ would require the pawl 54″ to be placed adjacent thereto. This would necessitate some form of support structure for the pawl 54″ extending outwardly from the axle means as shown, for example, in the previous embodiments in FIGS. 3 and 5. In addition, the push-pull cable 31″ would also have to be attached to the outer side of the drive wheel hub 38″. Thus, in order to remove the drive wheel 18″ the push-pull cable 31″ would have to be detached, and the support for the pawl 54″ would have to be removed. With the present assembly, however, these problems do not occur.

Turning to FIG. 6, the support legs 17″ each comprise a tubular metal member fixedly supported on the seat means 14″ and extending downwardly therefrom. The support legs 17″ rest on the ground and are rollably supported thereon by two support wheels 37″ rotatably disposed on each support leg 17″. The support wheels 37″ allow the support legs 17″ to rollably contact the ground without dragging as the wheelchair 10″ moves across a travel surface. Primarily, the support legs 17″ prevent the wheelchair 10″ from tipping over backwards as the wheelchair 10″ climbs an incline. The center of gravity of the wheelchair 10″ and the passenger tend to shift rearwardly toward the drive wheels 18″ as the wheelchair 10″ climbs an incline. If the center of gravity shifts beyond the axle of the drive wheels 18″, such as would occur on a steep incline, the wheelchair 10″ would tip backwards and dislodge the passenger. Normally, however, the wheelchair 10″ would roll rearwardly down the incline before the wheelchair 10″ would encounter a steep enough incline to force tipping. However, the ratchet means 22″ prevents rearward movement thereby aggravating this problem. The support legs 17″ extend behind the axle means 16″ of the wheelchair 10″, though, to provide an additional support for the wheelchair 10″ and essentially prevent the wheelchair 10″ from tipping over backwards.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A wheelchair assembly (10) for forwardly transporting a passenger in a sitting position and for preventing rearward motion when disposed on an incline, said wheelchair assembly (10) comprising:

a frame (12);

said frame (12) including an axle (16);

seat means (14) mounted on said frame (12) for supporting a passenger in a forwardly facing sitting position;

a drive wheel (18) rotatably supported on said axle (16) for rollably supporting said seat means (14) above a travel surface;

said drive wheel (18) including a drive wheel hub (38) rotatably supported on said axle (16);

ratchet means (22) ratchetingly interconnecting said frame (12) with said drive wheel (18) for permitting rotation of said drive wheel (18) in one direction with respect to said frame (12) while preventing rotation in the opposite direction whereby said wheelchair assembly (10) is freely moveable forwardly but is prevented from rearward movement;

said ratchet means (22) including a pawl (54) mounted on said frame (12); and characterized by said ratchet means (22) including a plurality of engaging surfaces (55) mounted on said drive wheel hub (38) for ratchetingly engaging said pawl (54).

2. An assembly (10) as set forth in claim 1 further characterized by said ratchet means (22) ratchetingly engaging said axle means (16) with both of said drive wheels (18).

3. An assembly (10) as set forth in claim 2 wherein said seat means (14) includes right and left sides, further characterized by said axle means (16) including right and left pintles extending outwardly from each of said respective right and left sides of said seat means (14).

4. An assembly (10) as set forth in claim 3 further characterized by said ratchet means (22) comprising at least one pawl (54) and a set of ratchet gear teeth (52).

5. An assembly (10) as set forth in claim 4 further characterized by each of said right and left pintles including one said pawl (54) pivotally connected thereto.

6. An assembly (10) as set forth in claim 5 further characterized by each of said drive wheels (18) including one said set of ratchet gears (52) connected thereto.

7. An assembly (10) as set forth in claim 6 further characterized by each of said drive wheels (18) including a fixedly connected drive wheel hub (38) comprising a hollow cylindrical center portion (44).

8. An assembly (10) as set forth in claim 7 further characterized by said hollow cylindrical center portion (44) including inner and outer flanges (40,42) each having inner and outer peripheries.

9. An assembly (10) as set forth in claim 8 further characterized by each of said inner peripheries of said outer flanges (42) including one of said ratchet gears (52) operatively disposed thereon.

10. An assembly (10) as set forth in claim 9 further characterized by each of said right and left pintles including a fixedly connected axle hub (49).

11. An assembly (10) as set forth in claim 10 further characterized by each of said axle hubs (38) comprising a drum rotatably disposed within one of said drive wheel hubs (38).

12. An assembly (10) as set forth in claim 11 further characterized by each of said axle hubs (49) including one of said pawls (54) pivotally connected thereto and biased by a spring (56) to continuously engage one of said ratchet gears (52).

13. An assembly (10') as set forth in claim 7 further characterized by each of said outer peripheries of said outer flanges (42') including one of said ratchet gears (52') disposed thereon.

14. An assembly (10) as set forth in claim 13 further characterized by each of said right and left pintles including a fixedly connected axle hub (49').

15. An assembly (10) as set forth in claim 14 further characterized by each of said axle hubs (49') comprising a cover plate enclosing one of said drive wheel hubs (38') therein.

16. An assembly (10) as set forth in claim 15 further characterized by each of said axle hubs (49') including one of said pawls (54') pivotally connected thereto and biased by a spring (56') to continuously engage one of said ratchet gears (52').

17. An assembly (10") as set forth in claim 1 further characterized by ratchet release means (15") for releasing said ratchet means (22") from said ratcheting interconnection between said frame (12") and said drive wheel (18") thereby permitting free rotation of said drive wheel (18") in any direction whereby said wheelchair assembly (10") can be moved rearwardly when desired.

18. An assembly (10") as set forth in claim 1 further characterized by said ratchet means (22") including a set of ratchet gear teeth (52") mounted on said drive wheel hub (38).

19. An assembly as set forth in claim 1 further characterized by said wheel (18) including at least one spoke (36) attached to said wheel hub (38) and extending radially outwardly therefrom.

20. An assembly as set forth in claim 19 further characterized by said drive wheel (18) including a wheel rim (34) attached to said spoke (36) and supported thereby for rotation about said axle (16).

21. An assembly as set forth in claim 18 further characterized by each of said ratchet gear teeth (52) including one of said engaging surfaces (57) disposed thereon.

22. An assembly (10") as set forth in claim 21 further characterized by said frame (12) including an axle bracket (23") fixedly attached to said axle (16).

23. An assembly (10") as set forth in claim 22 further characterized by said pawl (54") being pivotally connected to said axle bracket (23").

24. An assembly (10") as set forth in claim 17 further characterized by said ratchet release means (15") including a control handle assembly (20") disposed on said frame (12).

25. An assembly (10") as set forth in claim 24 further characterized by said ratchet release means (15") including a push-pull cable (31") connecting said control handle assembly (29") to said pawl (54") of said ratchet means (22") for joining said control handle assembly (29") and said pawl (54") in remote control engagement.

26. An assembly as set forth in claim 25 further characterized by said control handle assembly (29") including at least one control handle.

27. An assembly (10") as set forth in claim 1 further characterized by said drive wheel hub (38") including a flange (40") having a periphery.

28. An assembly (10") as set forth in claim 27 wherein said flange (40") includes an outer periphery, further characterized by said outer periphery of said flange (40") including said set of ratchet gear teeth (52") disposed thereon.

29. An assembly (10") as set forth in claim 1 further characterized by rear support legs (17") disposed on said seat means (14") and extending rearwardly therefrom.

30. An assembly (10) as set forth in claim 27 wherein said flange (42) includes an inner periphery, further characterized by said inner periphery of said flange (42) including said set of ratchet gear teeth (52) disposed thereon.

* * * * *